United States Patent
Rout et al.

(10) Patent No.: US 10,129,773 B2
(45) Date of Patent: Nov. 13, 2018

(54) METHODS AND APPARATUS FOR MANAGING DATA USE

(71) Applicant: Google Technology Holdings LLC, Mountain View, CA (US)

(72) Inventors: Satyabrata Rout, Bangalore (IN); Amit Kumar Agrawal, Bangalore (IN); Jayashree M. Yabannavar, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 126 days.

(21) Appl. No.: 14/222,742

(22) Filed: Mar. 24, 2014

(65) Prior Publication Data

US 2015/0271689 A1  Sep. 24, 2015

(51) Int. Cl.
| | |
|---|---|
| H04W 24/04 | (2009.01) |
| H04L 12/08 | (2006.01) |
| H04L 29/06 | (2006.01) |
| H04W 28/02 | (2009.01) |
| H04L 12/26 | (2006.01) |
| H04L 29/08 | (2006.01) |

(52) U.S. Cl.
CPC ......... *H04W 24/04* (2013.01); *H04L 43/0876* (2013.01); *H04L 65/4084* (2013.01); *H04L 65/602* (2013.01); *H04L 65/80* (2013.01); *H04W 28/0221* (2013.01); *H04L 67/10* (2013.01); *H04L 67/32* (2013.01); *H04L 69/14* (2013.01); *Y02D 70/00* (2018.01); *Y02D 70/1262* (2018.01); *Y02D 70/142* (2018.01)

(58) Field of Classification Search
CPC ... H04W 4/24; H04W 24/04; H04W 28/0221; H04M 2215/32; H04M 2215/2026; H04M 15/00; H04M 15/28; H04L 43/0876; H04L 65/4084; H04L 65/602; H04L 65/80

See application file for complete search history.

(56) References Cited

U.S. PATENT DOCUMENTS

| | | |
|---|---|---|
| 7,792,040 B2 | 9/2010 | Nair et al. |
| 7,970,436 B1 | 6/2011 | Katzer |
| 8,346,225 B2 | 1/2013 | Raleigh |
| 2005/0003761 A1 | 1/2005 | Chandley |

(Continued)

FOREIGN PATENT DOCUMENTS

WO  2012/148683 A2  11/2012

OTHER PUBLICATIONS

Flowplayer, Bandwidth detection, Offer the best viewing experience, flash.flowplayer.org/plugins/streaming/bwcheck.html, downloaded from internet: Dec. 10, 2013, all pages.

(Continued)

*Primary Examiner* — King Poon
*Assistant Examiner* — Vincent Peren
(74) *Attorney, Agent, or Firm* — Faegre Baker Daniels LLP

(57) ABSTRACT

Disclosed are systems and methods for managing data use by a user device. In an embodiment, the resolution of media generation, media presentation, or both are altered to optimize the device's usage of data under a data allotment. In a further embodiment, the device may serve as a data conduit to a second device for reasons of improved resolution, improved battery life, or to optimize data allotment.

20 Claims, 7 Drawing Sheets

(56) References Cited

U.S. PATENT DOCUMENTS

| | | | |
|---|---|---|---|
| 2005/0265395 A1* | 12/2005 | Kim | H04L 29/06027 370/485 |
| 2006/0203758 A1 | 9/2006 | Tee et al. | |
| 2007/0133603 A1 | 6/2007 | Weaver | |
| 2008/0049660 A1* | 2/2008 | Kwan | H04W 52/267 370/318 |
| 2008/0196066 A1 | 8/2008 | Matz | |
| 2008/0261529 A1 | 10/2008 | Rosenblatt | |
| 2009/0063703 A1* | 3/2009 | Finkelstein | G06F 17/30056 709/240 |
| 2009/0164688 A1 | 6/2009 | Wright-Riley | |
| 2009/0325622 A1 | 12/2009 | Matsumura | |
| 2011/0019566 A1 | 1/2011 | Leemet et al. | |
| 2012/0278495 A1 | 11/2012 | Furbeck | |
| 2013/0159470 A1 | 6/2013 | Wang | |
| 2013/0166391 A1 | 6/2013 | Blow et al. | |
| 2013/0262890 A1 | 10/2013 | Marshall et al. | |
| 2013/0331028 A1 | 12/2013 | Kuehnel et al. | |
| 2013/0342637 A1 | 12/2013 | Felkai et al. | |
| 2013/0346624 A1* | 12/2013 | Chervets | H04M 15/58 709/231 |
| 2014/0010282 A1 | 1/2014 | He et al. | |
| 2014/0068013 A1* | 3/2014 | Chen | H04L 65/60 709/219 |
| 2014/0187195 A1* | 7/2014 | Pallares Lopez | H04L 12/1432 455/405 |
| 2014/0201319 A1 | 7/2014 | Mannan | |
| 2014/0237081 A1* | 8/2014 | Zhu | H04L 67/327 709/219 |
| 2015/0065084 A1 | 3/2015 | Sheikh | |
| 2015/0099505 A1* | 4/2015 | Kiukkonen | H04M 1/7253 455/419 |
| 2015/0271784 A1 | 9/2015 | Rout et al. | |
| 2015/0271785 A1 | 9/2015 | Rout et al. | |

OTHER PUBLICATIONS

International Search Report; European Patent Office; International Application No. PCT/US2015/022114; dated Sep. 4, 2015.
International Search Report; European Patent Office; International Application No. PCT/US2015/022126; dated Aug. 10, 2015.
International Search Report; European Patent Office; International Application No. PCT/US2015/022118; dated Sep. 22, 2015.

* cited by examiner

METHODS AND APPARATUS FOR MANAGING DATA USE

CROSS-REFERENCE TO RELATED APPLICATIONS

The present application is related to U.S. patent application Ser. No. 14/222,723, filed Mar. 24, 2014, entitled "MANAGING DEVICE RESOURCES AND CONFIGURATION". And U.S. patent application Ser. No. 14/222,748, filed Mar. 24, 2014, entitled "MANAGING DEVICE RESOURCES AND CONFIGURATION", which applications are hereby incorporated by reference in their entireties.

TECHNICAL FIELD

The present disclosure is related generally to managing resources available to a device and, more particularly, to a system and method for managing data usage and battery usage.

BACKGROUND

Every computing device, whether embedded, mobile, or stationary, is the result of certain compromises made during design to support one or more functions or capabilities at a cost to one or more other functions or capabilities. Moreover, hardware and software limitations associated with current technologies such as screens, batteries, spectrum usage, etc., constrain such devices in other ways. As a result, most computing devices are subject to one or more constraints in communication, power, portability, or other dimensions.

Thus, for example, a portable communications device such as a smartphone may provide great portability at the cost of requiring a battery for power, limiting total continuous on-time usage. The same goal may also require limitations on screen size and hence on screen resolution. Similarly, a frequently used device may experience wireless communications blackouts or impediments due to imposition of a data allotment, e.g., within cellular, broadband, and other wireless contexts. Some devices may lack cellular or broadband capabilities but may have heightened resolution. In general, the compromises that are made in producing, configuring, or provisioning various devices may result in decreased user experience and usability.

It should be appreciated that any particular benefit is not a limitation on the scope of the disclosed principles or of the attached claims, except to the extent expressly recited in the claims. Additionally, the discussion of technology in this background section is merely reflective of inventor observations or considerations and is not an indication that the discussed technology represents actual prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before providing a detailed discussion of the figures, a brief overview is given to guide the reader. Disclosed are systems and methods for managing data use by a user device. In an embodiment, the resolution of media generation, media presentation, or both are altered to optimize the device's usage of data under a data allotment. As the phrase is used herein, "data allotment" includes data allotments of various sizes, e.g., very small data allotments as well as very large or even unlimited data allotments. Moreover, a data allotment may be a single allotment or one of a series of periodic allotments, e.g., under a service contract with a data provider, potentially including a penalty for exceeding the allotment. A smartphone without affordable available data is not able to do the things that mark it as "smart," i.e., email, instant messaging, shopping, etc. In a further embodiment, the device may serve as a data conduit to a second device for reasons of improved resolution or improved battery life.

Turning now to a more detailed discussion in conjunction with the attached figures, techniques of the present disclosure are illustrated as being implemented in a suitable environment. The following description is based on embodiments of the disclosed principles and should not be taken as limiting the claims with regard to alternative embodiments that are not explicitly described herein.

Figure 1:
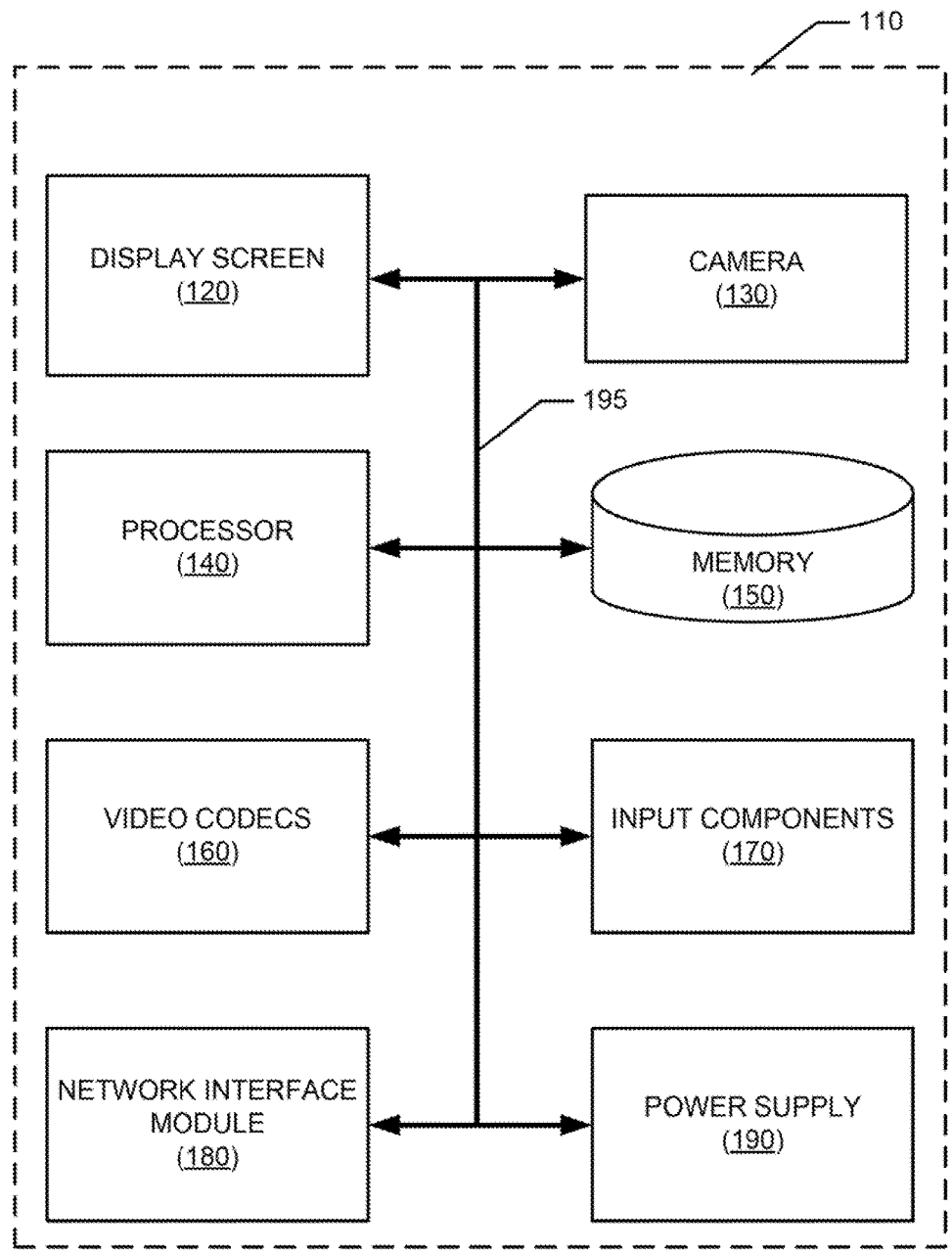
FIG. 1 is a schematic diagram of a mobile computing device such as a smartphone, cell phone, etc., within which embodiments of the disclosed principles may be implemented.

The schematic diagram of FIG. 1 shows an exemplary device forming part of an environment within which aspects of the present disclosure may be implemented. In particular, the schematic diagram illustrates a user device 110 including several exemplary components. It will be appreciated that additional or alternative components may be used in a given implementation depending upon user preference, cost, and other considerations.

In the illustrated embodiment, the components of the user device 110 include a display screen 120, a camera 130, a processor 140, a memory 150, one or more video codecs 160, and one or more input components 170.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random-access memory (i.e., Synchronous Dynamic Random-Access Memory, Dynamic Random-Access Memory, RAMBUS Dynamic Random-Access Memory, or any other type of random-access memory device). Additionally or alternatively, the memory 150 may include a read-only memory (i.e., a hard drive, flash memory, or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer-readable medium (e.g., memory 150) to control basic functions of the electronic device 110. Such functions may include, for example, interaction among various internal components and storage and retrieval of applications and data to and from the memory 150.

The device 110 also includes a network-interface module 180 to provide wireless communications from and to the device 110. The network-interface module 180 may include multiple communications interfaces, e.g., for cellular, WiFi, broadband, and other communications. A power supply 190, such as a battery, is included for providing power to the device 110 and its components. In an embodiment, all or some of the internal components communicate with one another by way of one or more shared or dedicated internal communication links 195, such as an internal bus.

Further with respect to the applications, these typically utilize the operating system to provide more specific functionality, such as file-system service and handling of protected and unprotected data stored in the memory 150. Although many applications may govern standard or required functionality of the user device 110, in many cases applications govern optional or specialized functionality, which can be provided, in some cases, by third-party vendors unrelated to the device manufacturer.

Finally, with respect to informational data, e.g., program parameters and process data, this non-executable information can be referenced, manipulated, or written by the operating system or an application. Such informational data can include, for example, data that are preprogrammed into the device 110 during manufacture, data that are created by the device 110, or any of a variety of types of information that is uploaded to, downloaded from, or otherwise accessed at servers or other devices with which the device 110 is in communication during its ongoing operation.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user-interface objects (e.g., toggling through various icons that are linked to executable applications).

Figure 2:
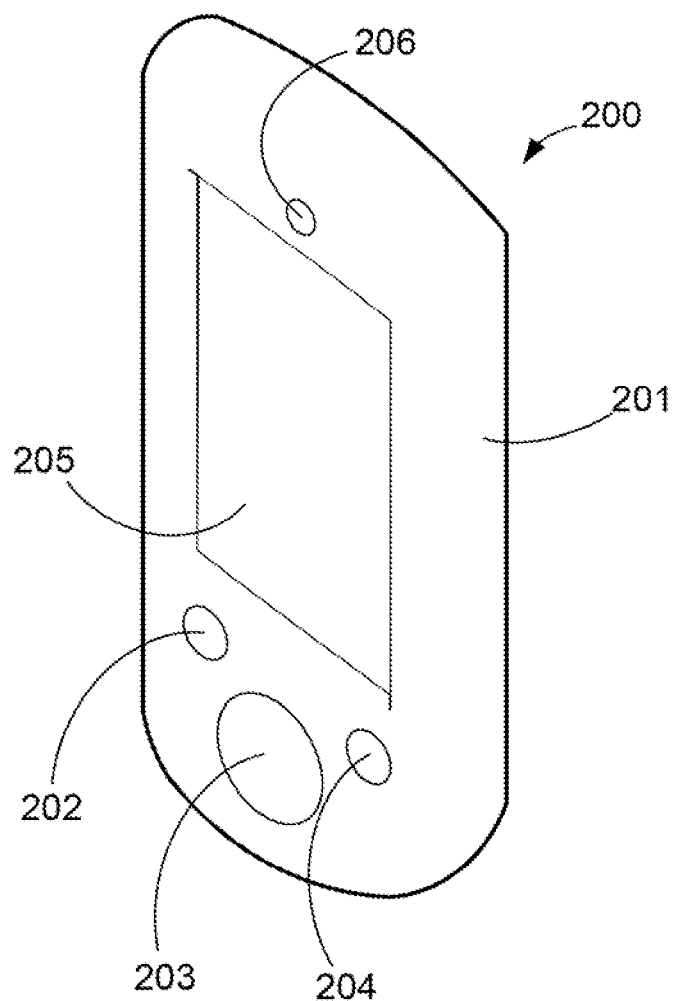
FIG. 2 is a perspective front view of a mobile computing device such as that shown in FIG. 1.

FIG. 2 presents a simplified perspective illustration of an example user device 200 within which embodiments of the disclosed principles may be implemented. As shown, the user device 200 generally includes a body or case 201 that allows a user to hold and handle the device 200. In addition, the case 201 serves to protect the internal components of the device 200 and to provide an anchor for external interface ports and components such as headphone jacks and hardware buttons 202, 203, 204. The illustrated device 200 also includes a display screen 205, for displaying images, videos, and user-interface components.

Figure 3:
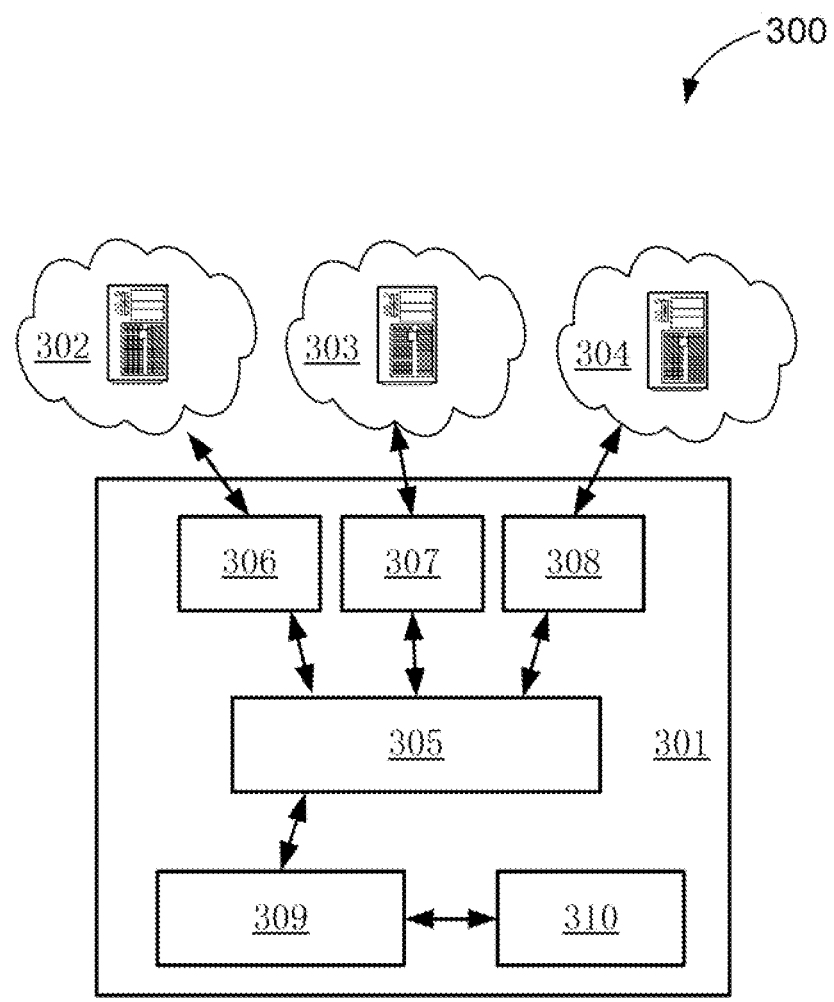
FIG. 3 is a device and network diagram in accordance with an embodiment of the disclosed principles.

Referring now to FIG. 3, an example device environment 300 is shown with functional modules and equipment. In the example embodiment of FIG. 3, a single user device 301 is associated with a data plan that provides access to one or more content providers 302, 303, 304, via, e.g., one or both of a cellular network and a broadband network. In an embodiment, the data plan is limited, for example, such that the accumulated use of data by the device 301 is capped at a predetermined amount of data, e.g., within a given period, such as a month.

In use, the device 301 of FIG. 3 includes a group 305 of one or more running applications 306, 307, 308. The one or more running application 306, 307, 308 are media applications in an embodiment. That is, the applications 306, 307, 308 primarily generate or consume media content. Examples of media applications include FACEBOOK™, NETFLIX™, and YOUTUBE™ (or a browser uploading to or downloading from any of these). The use of such applications is generally data intensive since media-content data sets are often very large.

The device 301 shown in FIG. 3 operates via a devices system framework ("DSF") 309, described in greater detail below. Finally, the device 301 also runs a data-usage monitor module ("DUMM") 310 in an embodiment. As discussed in greater detail below, the DUMM 310 determines usage patterns and data requirements and executes configuration decisions based on needed and remaining data allotment, device resolution, device battery level, and so on. In yet another embodiment, the DUMM 310 resides outside the device 301.

As noted above, high speed 3G and LTE cellular data plans as well as most broadband plans come with a specified data allotment. Exceeding the data allotment often leads to significant bandwidth throttling (which may render the device essentially unusable for some purposes) or the imposition of significant charges for the excess data consumed. For this reason, mobile-device users often look for alternative data channels such as free Wi-Fi. However, when free Wi-Fi is not available, users have to use metered data connections if they need connectivity.

A typical mobile-device user (mobile devices including cell phones, smartphones, tablets, and so on) underestimates the rapidity or frequency with which he may exceed his plan's data allotment. This is in part due to the fact that users typically are unaware of the data requirements associated with current high-performance devices (e.g., higher screen resolution, support for faster networks and higher processing speeds). For example, YOUTUBE™ video provides content encoded at any of various resolutions such as low, medium, qHD, HD, full HD, and so on. The selection of the content to be streamed is dependent on the consumption device's capabilities. Since most smartphone devices have high-resolution screens, this content stream would be at a higher resolution, resulting in higher data usage. Similarly, the same points affect the data needed for uploading and sharing content.

Most users either curb their usage significantly as they near the data allotment or completely stop data usage as they near their limit for fear of incurring high charges. In either case, the user effectively forgoes the service they would have otherwise enjoyed. Similar behavior patterns are exhibited for capped household broadband services (unlimited high speed plans come with significant higher cost). Moreover, plans designated as "unlimited" often have bandwidth throttling after some data-usage limit is reached, rendering the service almost unusable for many purposes.

Often, household broadband service is shared among multiple devices owned by one or more respective owners, with different devices potentially providing different respective resolutions. For example, family data plans are shared by family members carrying different devices with different resolutions. While there may be provisions to specify a sub-limit for each device or user under a family data plan, effective utilization of the complete data plan is not usually achieved.

As will be appreciated from the foregoing, it is beneficial to allow a user to efficiently use his allotted data, both to maximize at least one or both of the amount and quality of content that can be experienced as well as to ensure that the user does not forfeit unused data allotment or exceed the data allotment and incur charges. In an embodiment, the user selects content to be viewed via an application. The application requests that the DSF provide it with device capabilities, and in particular, the device resolution and data connection type (Broadband, 2G, 3G, etc.). In turn, the DSF requests that the DUMM module provide session resolution ("ses_res") and connection type ("ses_bw"). In yet another embodiment, when DUMM determines that a user has sufficient data, it may suggest that the device use higher quality content as per channel capacity.

The DUMM computes the ses_res and ses_bw parameters dynamically for the session based on user-behavior patterns and remaining data allocation. In other words, instead of necessarily specifying the actual device resolution, the DUMM specifies a resolution that will allow the user to view the content without eventually exceeding his data allotment for the time period given his usage patterns. The DSF responds to the device capability request by providing the ses_res and ses_bw to the requesting application. The application then communicates to the server to obtain the desired content with the ses_res and ses_bw determined by the DUMM.

In another embodiment, the DUMM computes the ses_res and ses_bw parameters dynamically for the session based on current battery level of the device. In other words, instead of necessarily specifying the actual device resolution, the DUMM specifies a resolution that will allow the user to view the content without exhausting the battery. The DSF responds to the device capability request by providing the ses_res and ses_bw to the requesting application. The application then communicates to the server to obtain the desired content with the ses_res and ses_bw determined by the DUMM.

Figure 4:
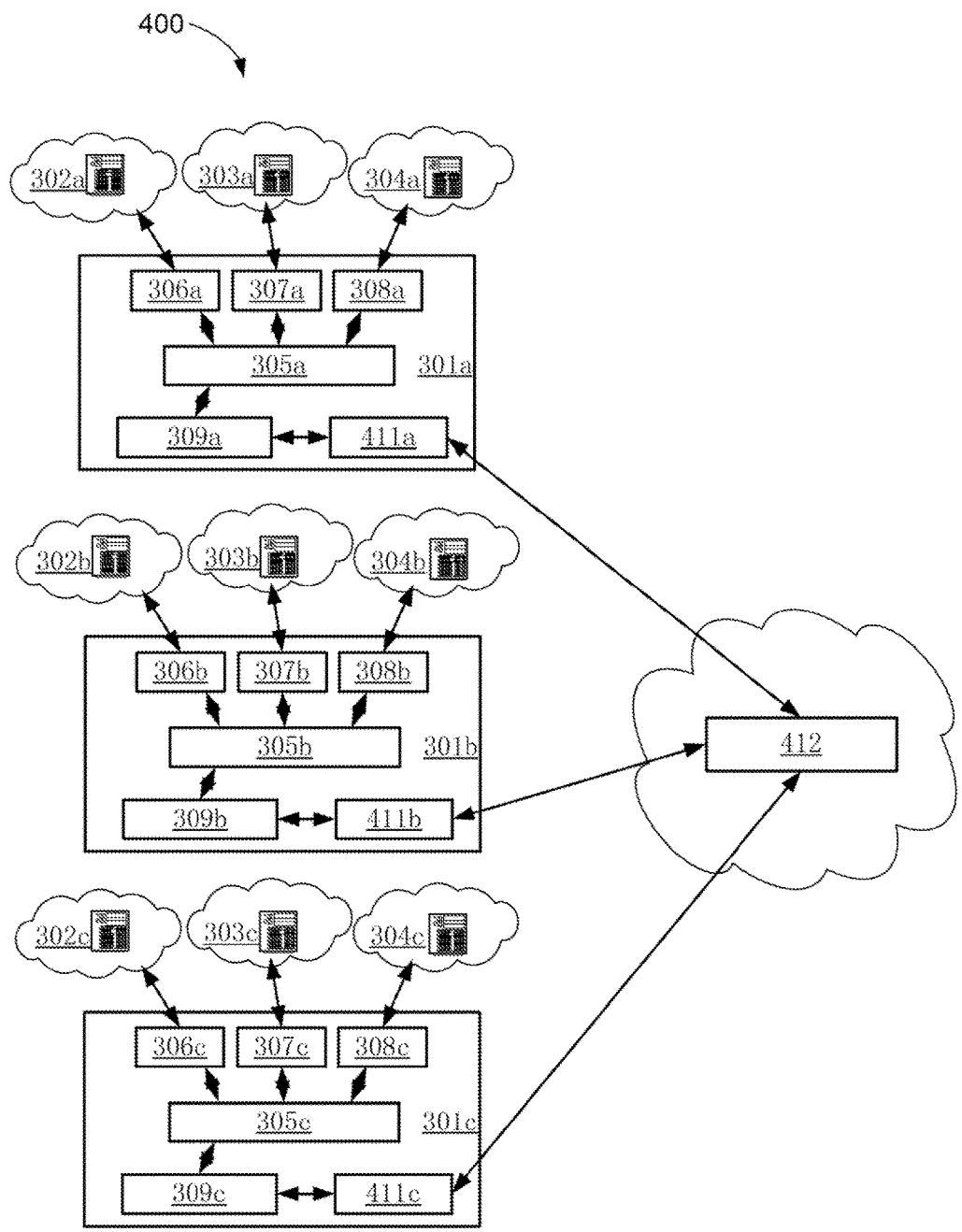
FIG. 4 is a device and network diagram in accordance with an embodiment of the disclosed principles.

FIG. 4 shows an alternative arrangement 400 wherein multiple devices 301a, 301b, 301c share a single data plan. In the illustrated example, each device 301a, 301b, 301c is essentially as shown in FIG. 3. However, instead of the DUMM 310, the devices 301a, 301b, 301c include a Device DUMM Interface Module ("DDIM") 411a, 411b, 411c. Each DDIM 411a, 411b, 411c shares device-capability information (resolution, bandwidth supported, battery level) with a network-accessible DUMM 412. In particular, each DDIM 411a, 411b, 411c interacts with the DUMM 412 to get session resolution and connection type (dev1_ses_res, dev1_ses_bw). Similarly, each DDIM 411a, 411b, 411c shares data-usage statistics with the DUMM 412. Based on feedback, the DUMM 412 may readjust devn_ses_res and devn_res_bw in the same session. Each device 301a, 301b, 301c uses the received devn_ses_res and devn_ses_bw to request the corresponding content from the content server.

Similar to the scenario of a single user using a single device for a data plan, the system shown in FIG. 4 may also optimize data usage by overriding device or application settings to use the device resolution specified by the DUMM 412. However, given that the system shown in FIG. 4 consists of multiple devices with various resolutions sharing a single data plan, other approaches may also be considered. For example, each user may be given a sub-limit within the subscribed data plan. In an embodiment, if the DUMM 412 determines that one device is not fully using its data sub-limit, then the DUMM 412 may offer higher bandwidth or higher resolution content to another device which is also using data.

As noted above, as different users use different devices, their usage is monitored by the relevant device DDIM, and the usage is uploaded to the DUMM 412 located in the cloud. The DUMM 412 coordinates and monitors data use by different users and devices to generate usage patterns. Based on a high-usage pattern (e.g., one where the user or plan will prematurely exhaust the data allotted), the DUMM 412 may degrade the data to or from each device gracefully, such as by lowering resolution as discussed above. In an embodiment, a user priority may be defined to provide different resolution content to different users. For example, a parent's device may have a high priority such that it receives HD content, while a child's device may be degraded to qHD content.

With respect to uploading data from a particular device subject to an accumulated data limit, the DUMM 412, whether cloud-based or device-based, may throttle the user's upload and sharing behavior. In an example process, the DUMM 412 monitors the usage pattern and behavior of the user capturing and uploading media content with the device's default capabilities (e.g., default resolution).

If the DUMM 412 determines that the uploading and sharing behavior is, on average, consuming more data than would be appropriate to stay under the data allotment, then the DUMM 412 may execute data-usage reduction steps. Appropriate data-usage reduction steps may include, for example, instructing the device to capture media in a less data-consuming format, e.g., in qHD rather than HD, and recommending data compression of media content while uploading and sharing such content.

Figure 5:
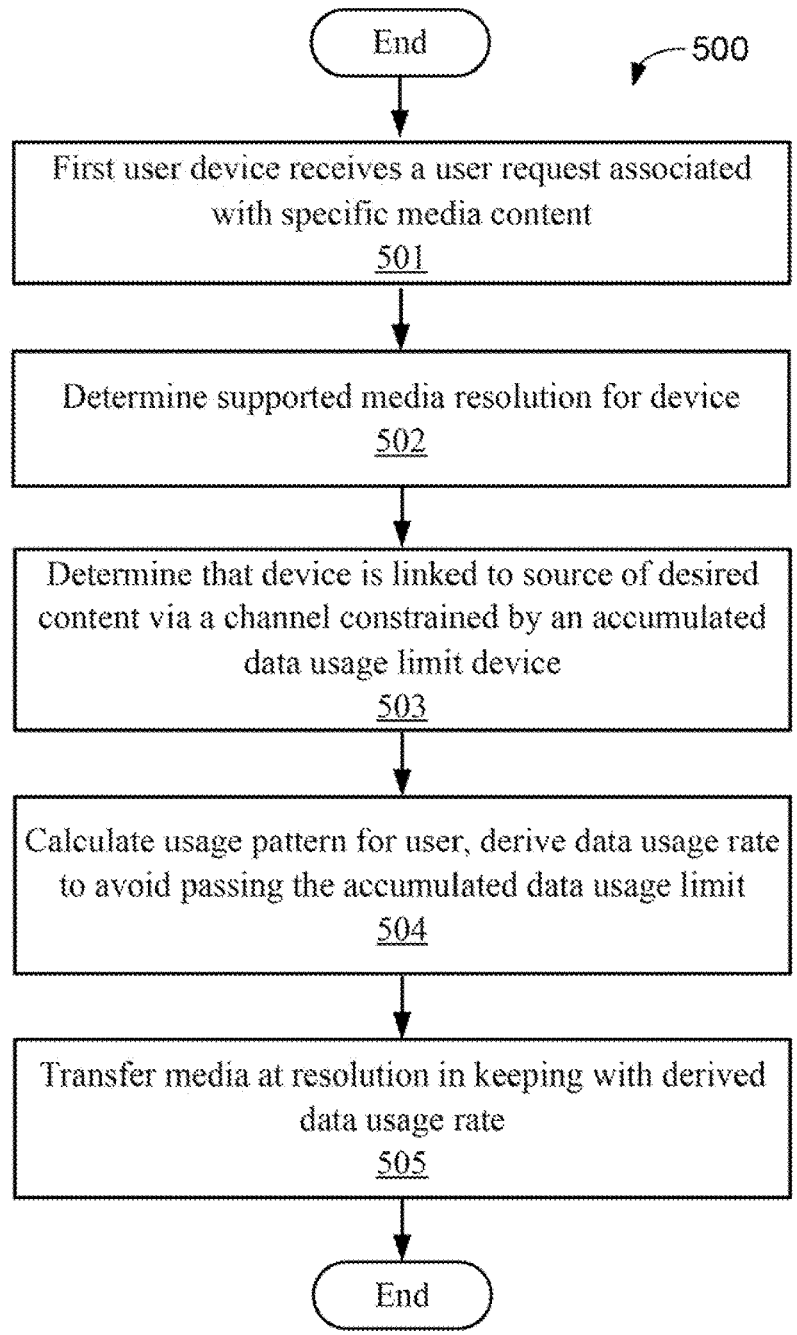
FIG. 5 is a flowchart showing a process of data management in accordance with an embodiment of the disclosed principles.

The flowchart of FIG. 5 illustrates an exemplary process 500 of managing data use by a user device based on device resolution. At stage 501 of the process 500, the user device receives a user request associated with specific media content. The request may be pursuant to user activation of a hyperlink or other link to the media. The device's supported media resolution (e.g., screen resolution, processor-limited resolution, etc.) is detected at stage 502, and at stage 503 it is determined that the device is linked to the source of the desired media content via a channel which is constrained by an accumulated data-usage limit.

A usage pattern is calculated for the user and is used to derive a data-usage rate that would allow the user to avoid passing the accumulated data-usage limit at stage 504. Finally at stage 505, the media are transferred at a resolution in keeping with the derived data-usage rate.

It should be noted that a process akin to 500 may also be used to provide higher media resolution, e.g., an optimized resolution, such as when the default resolution for the consuming device or application is lower than what can be easily supported under the data allotment. The process of changing the resolution in either case may require technical formalities such as negotiating, handshaking, and so on, as will be appreciated by those of skill in the art.

The configuration of devices and systems shown in FIG. 4 has been described in the context of multiple devices sharing a data plan. However, the illustrated architecture also supports a scenario of multiple co-located friends and family users using different devices having individual data plans. In this scenario, the DUMM 412 may take a similar approach. The usage pattern of each user and his respective plan is uploaded to the DUMM 412 via the respective DDIMs. The DUMM 412 then determines whether one user has more data remaining under his data allotment while another user is prematurely coming close to the data allotment.

The DUMM 412 also determines if the relevant devices are co-located (to within the communication range of a short-range technology supported by both devices). If so, then the DUMM 412 sends a recommendation to both the devices to share data, wherein the device with more remaining data becomes the source of the data, and the other device becomes the data sink. The channel for transferring media from the first device to the second may be referred to as a data pipe. One technology usable to enable the recommended data sharing is Tethering (or Mobile Hotspot).

So by way of example, consider a father who has 500 MB of data left on his plan (under the cap), and his usage pattern shows that he will likely utilize only 100 MB before the data-limit period ends. If the DUMM 412 determines that a co-located son on a different data plan is running out of data, then it sends recommendation to the devices of the father and son recommending that they connect using Tethering so that the son can stream the data he wants to his device via his father's data connection.

Figure 6:
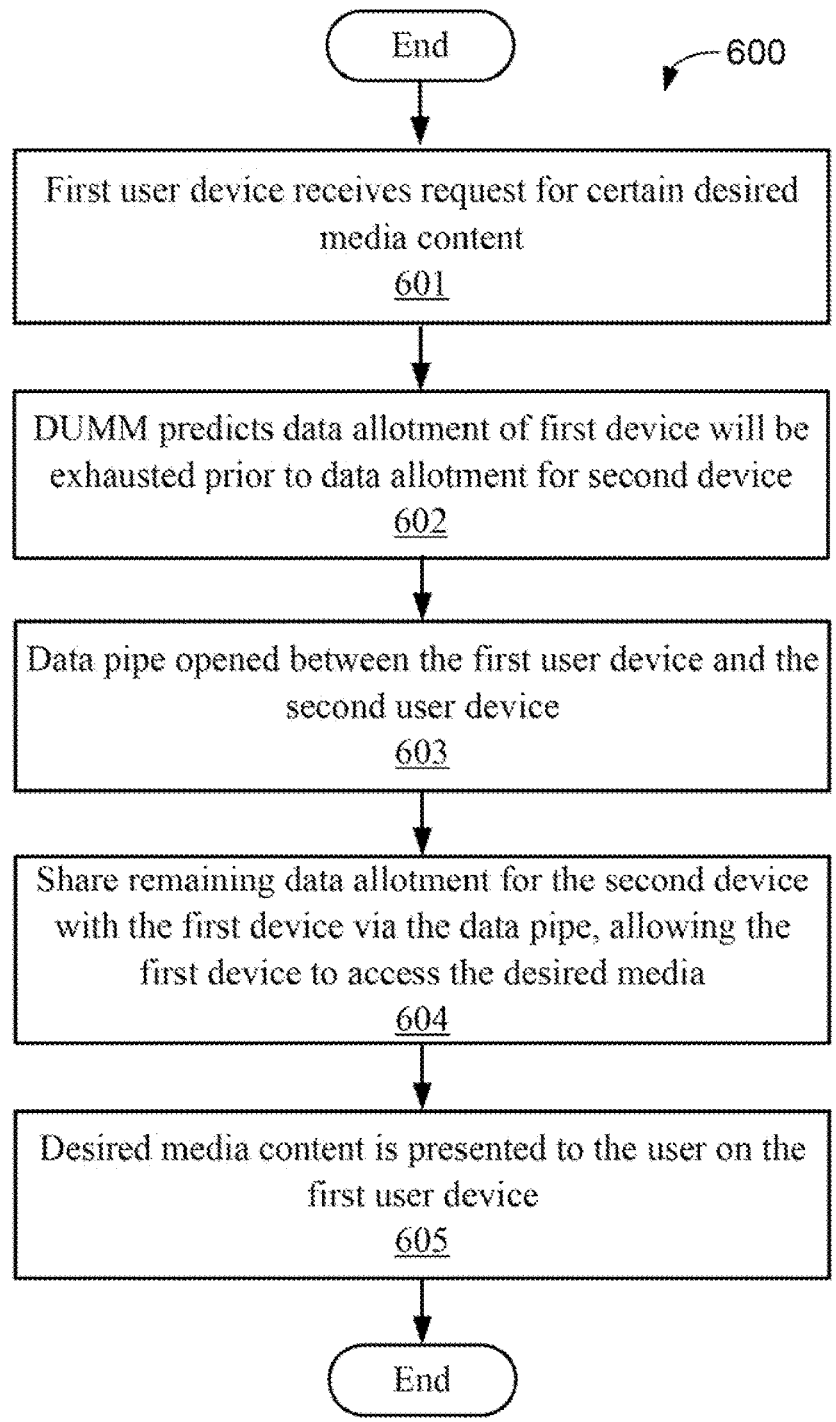
FIG. 6 is a flowchart showing an alternative process of data management in accordance with an embodiment of the disclosed principles.

FIG. 6 is a flowchart showing an exemplary process 600 for managing data use between a first user device and a second user device. For the illustrated example, each device has a respective remaining data allotment, e.g., pursuant to a cellular or broadband data plan. At stage 601 of the process 600, the first user device receives a request for certain desired media content residing on a remotely located data source such as an Internet server. The request may be, for example, a result of a user selection on an interface of the device, such as "clicking" or selecting a hyperlink.

At stage 602, a DUMM associated with the device predicts that, using default settings, the remaining data allotment of the first device will be exhausted prior to the end of the data period associated with the remaining data allotment for the first device, however the remaining data allotment for the second device will not be exhausted prior to the end of its data period. In response, a data pipe is opened between the first user device and the second user device at stage 603. At stage 604, the remaining data allotment for the second device is shared with the first device via the data pipe, allowing the first device to access the desired media. The desired media so obtained are presented to the user on the first user device at stage 605.

Figure 7:
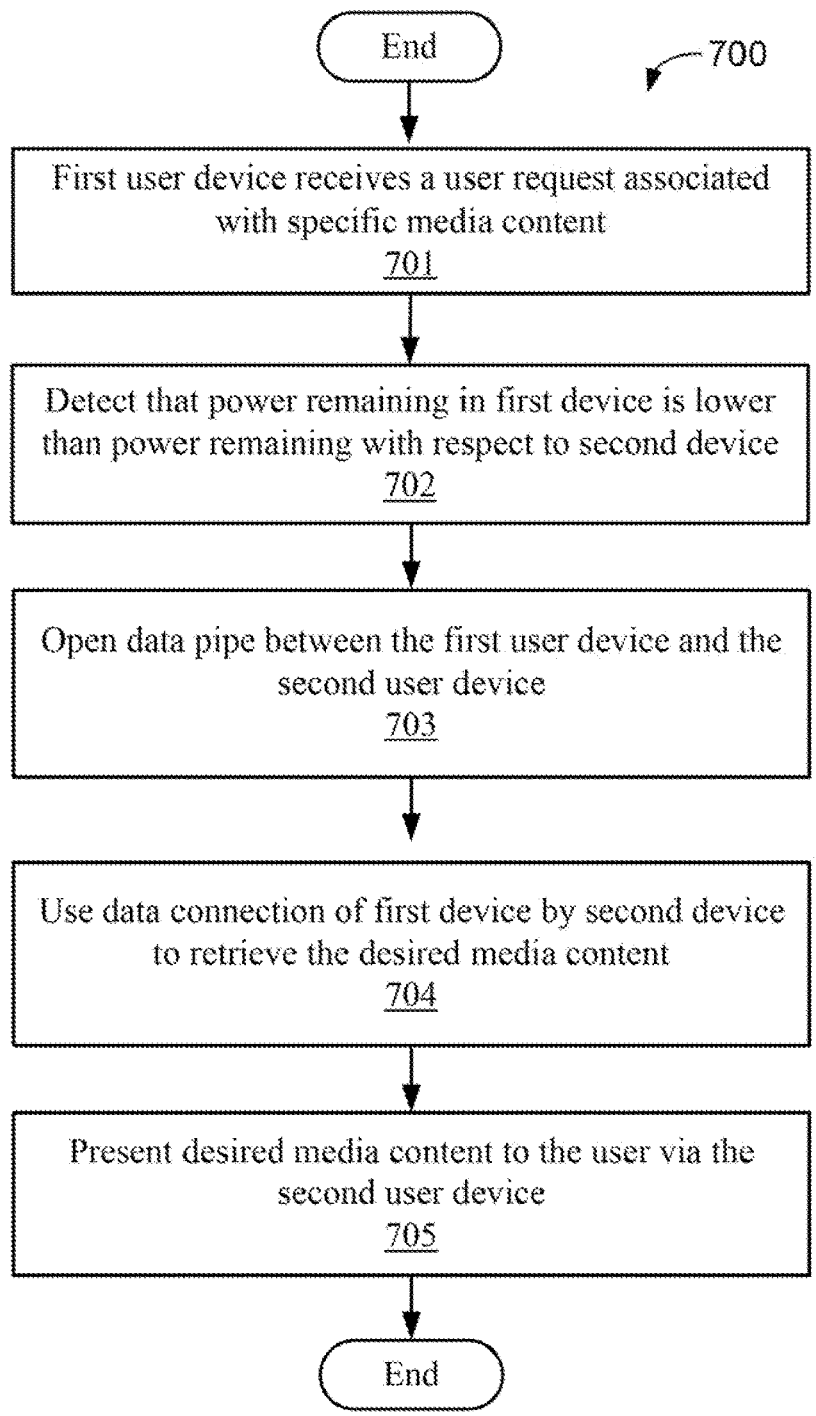
FIG. 7 is a flowchart showing a process of data management in accordance with yet another embodiment of the disclosed principles.

As noted above, in an embodiment the data usage of one or more devices may be managed to create a power-saving result for one device. An example 700 of such a process is shown in the flowchart of FIG. 7. At stage 701 of the process 700, a first user device receives a user request for desired media content, e.g., via one of the mechanisms discussed above. The device determines at stage 702 that the available power remaining in the first device is not sufficient to complete the desired operation, and the power remaining in the first device is lower than the power remaining with respect to the second device. The available power may be, for example, battery power. In addition, the second device may be plugged into a power source such as a household electrical socket, in which case its available power is considered to be infinite.

At stage 703, a data pipe between the first user device and the second user device is opened, and the data connection of the first device is used by the second device at stage 704 to retrieve the desired media content. The desired media content is presented to the user via the second user device at stage 705.

In view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of managing data use by a user device, the method comprising:

receiving, at the user device, a user request for desired media content;

determining, by the user device, whether the user device is linked to a source of the desired media content via a wireless channel constrained by an accumulated data-usage limit;

calculating, by the user device, a usage pattern of a user of the user device, the usage pattern indicating that the user will prematurely pass the accumulated data-usage limit;

deriving, by the user device, a data-usage rate based on the usage pattern of the user of the user device, the data-usage rate allowing the user to avoid passing the accumulated data-usage limit when the user device is linked to the source of the desired media content via the wireless channel constrained by the accumulated data-usage limit;

specifying, by the user device, a resolution based on the data-usage rate instead of specifying an actual resolution supportable by the user device or an application running thereon, the specified resolution being less than the actual resolution;

requesting, by the user device, the desired media content from the source of the desired media content at the specified resolution; and obtaining, by the user device, the desired media content from the source of the desired media content at the specified resolution.

2. The method of claim 1 wherein the constrained wireless channel includes at least one of a broadband channel or a cellular channel.

3. The method of claim 1 wherein deriving the data-usage rate includes determining usage rates for one or more other users who share the accumulated data-usage limit.

4. The method of claim 1 wherein the accumulated data-usage limit is a data plan limit under one or more service contracts.

5. The method of claim 1 further comprising increasing the use of cellular data of the user device relative to the use of broadband data during a cellular data period of the user device when requesting and obtaining the desired media content at the specified resolution if it is determined that remaining data allotment will not be exhausted prior to an end of the cellular data period.

6. The method of claim 1 wherein the user device is one of a plurality of devices on a single data plan.

7. The method of claim 1 wherein deriving a data-usage rate further comprises analyzing present battery capacity of the user device and taking remedial action based on the present battery capacity, wherein the remedial action includes at least one of reducing the specified resolution or switching to another device for presentation of the desired content.

8. The method of claim 7 wherein switching to another device for presentation of the desired content includes determining that battery capacity of the other device is greater than the present battery capacity of the user device.

9. The method of claim 1 wherein calculating the usage pattern of the user of the user device includes analyzing a prior data usage by the user when using the actual resolution of the user device or the application running thereon.

10. The method of claim 9 further comprising determining whether a current data usage by the user would pass the accumulated data-usage limit based on the usage pattern of the user of the user device, and deriving the data-usage rate is in response to determining that the current data usage by the user would pass the accumulated data usage limit.

11. A user device configured for data usage management, the user device being subject to a data allotment, the user device comprising:
    memory storing a media application; and
    a processor communicatively coupled to memory, the processor configured to:
        receive at the user device a user request for desired media content;
        determine whether the user device is linked to a source of the desired media content via a wireless channel constrained by an accumulated data-usage limit;
        calculate a usage pattern of a user of the user device, the usage pattern indicating that the user will prematurely pass the accumulated data-usage limit;
        derive a data-usage rate based on the usage pattern of the user of the user device, the data-usage rate allowing the user to avoid passing the accumulated data-usage limit when the user device is linked to the source of the desired media content via the wireless channel constrained by the accumulated data-usage limit;
        specify a resolution based on the data-usage rate instead of specifying an actual resolution supportable by the user device or an application running thereon, the specified resolution being less than the actual resolution;
        request the desired media content from the source of the desired media content at the specified resolution; and
        obtain the desired media content from the source of the desired media content at the specified resolution.

12. The user device of claim 11 wherein the constrained wireless channel includes at least one of a broadband channel or a cellular channel.

13. The user device of claim 11 wherein the processor is further configured, when deriving the data-usage rate, to determine usage rates for one or more other users who share the accumulated data-usage limit.

14. The user device of claim 11 wherein the accumulated data-usage limit is a data plan limit under one or more service contracts.

15. The user device of claim 11 wherein the processor is further configured to increase the use of cellular data of the user device relative to the use of broadband data during a cellular data period of the user device when requesting and obtaining the desired media content at the specified resolution if it is determined that remaining data allotment will not be exhausted prior to an end of the cellular data period.

16. The user device of claim 11 wherein the user device is one of a plurality of devices on a single data plan.

17. The user device of claim 11 wherein the processor is further configured, when deriving the data-usage rate, to analyze present battery capacity of the user device and taking remedial action based on the present battery capacity, wherein the remedial action includes at least one of reducing the specified resolution or switching to another device for presentation of the desired content.

18. The user device of claim 17 wherein switching to another device for presentation of the desired content includes determining that battery capacity of the other device is greater than the present battery capacity of the user device.

19. The user device of claim 11 wherein the processor is further configured, when calculating the usage pattern of the user of the user device, to analyze a prior data usage by the user when using the actual resolution of the user device or the application running thereon.

20. The user device of claim 19 wherein the processor is further configured to determine whether a current data usage by the user would pass the accumulated data-usage limit based on the usage pattern of the user of the user device, and the processor is further configured, when deriving the data-usage rate, to derive the data-usage rate in response to determining that the current data usage by the user would pass the accumulated data usage limit.

* * * * *